United States Patent

Savakis

[11] Patent Number: 6,044,179
[45] Date of Patent: Mar. 28, 2000

[54] DOCUMENT IMAGE THRESHOLDING USING FOREGROUND AND BACKGROUND CLUSTERING

[75] Inventor: Andreas E. Savakis, Rochester, N.Y.

[73] Assignee: Eastman Kodak Company, Rochester, N.Y.

[21] Appl. No.: 08/978,568

[22] Filed: Nov. 26, 1997

[51] Int. Cl.[7] .................................................. G06K 9/38
[52] U.S. Cl. ...................... 382/270; 382/272; 358/464; 358/466
[58] Field of Search ................................. 382/270, 272, 382/195, 205, 237; 358/465, 466, 464, 455, 456, 448

[56] References Cited

U.S. PATENT DOCUMENTS

| | | | |
|---|---|---|---|
| 4,468,704 | 8/1984 | Stoffel et al. | |
| 4,593,325 | 6/1986 | Kannapell et al. | 382/270 |
| 4,885,784 | 12/1989 | Miyagawa et al. | 358/464 |
| 5,583,659 | 12/1996 | Lee et al. | 358/466 |
| 5,703,971 | 12/1997 | Asimopoulos et al. | 382/270 |

OTHER PUBLICATIONS

P.K. Sahoo, S. Soltani, A.K.C. Wong and Y. Chen, "A Survey of Thresholding Techniques," Computer Vision Graphics Image Processing, vol. 41, pp. 233–260, 1988.
P. Palumbo P. Swaninathan and S. Shrihari, "Document Image Binarization: Evaluation of Algorithms," SPIE Applications of Digital Image Processing IX, vol. 697, pp. 278–285, 1986.
J.S. Weszka, "A Survey of Threshold Selection Techniques," Computer Graphics Image Processing, vol. 7, pp. 259–265, 1978.

*Primary Examiner*—Thomas D. Lee
*Attorney, Agent, or Firm*—Nelson Adrian Blish

[57] ABSTRACT

Document image thresholding using foreground and background is disclosed. A document (16) is scanned and a region (30) and a sub-region (32) of the document is selected. The intensity value of a pixel in the region is compared to an average intensity value of pixels in a foreground cluster and to an average intensity value of pixels in a background cluster (50). The pixel is assigned to the foreground cluster (53) if the intensity value of the pixel is closer to the average intensity of the foreground cluster, or to the background cluster (54) if the pixel intensity is closer to the average intensity value of the background cluster. A new average intensity value is calculated for the foreground cluster (55) and the background cluster (56). A new pixel is compared to the new average intensity values for the foreground and background clusters and the process is repeated until all pixels in the region have been compared (57). A threshold value is computed (62) based on a function of the average intensity value of pixels in the foreground and background cluster. Each pixel in the sub-region is then converted to a white pixel if the pixel intensity level is greater than the threshold value, or converted to a black pixel if the pixel intensity level is less than the threshold value (62).

15 Claims, 8 Drawing Sheets

DOCUMENT IMAGE THRESHOLDING USING FOREGROUND AND BACKGROUND CLUSTERING

FIELD OF THE INVENTION

The present invention relates in general to document image scanning, and more particularly, to digital image processing using imaging thresholding for conversion of grayscale images to black and white.

BACKGROUND OF THE INVENTION

Document scanners digitize paper documents using a linear charged coupled device (CCD) array to capture an image of the document. The CCD array provides grayscale information, eight bits per pixel, to an image processing board. A typical grayscale image 10 is shown in FIG. 1. Grayscale images are relatively large, require significant random access memory to process the digital image, and require large segments of disk space to store the image. Image thresholding is often used to reduce the number of bits per pixel to one bit, black or white, and results in a significant reduction in the size of the image file. FIG. 2 shows a black and white image 12 after conversion of the grayscale image 10 shown in FIG. 1.

One method of converting a grayscale image to a black and white image is described in U.S. Pat. No. 5,583,659, "Multi-Windowing Technique for Thresholding an Image Using Local Image Properties." This type of adaptive threshold processing algorithm works well, but requires two input settings, one setting for the fixed threshold level, and one setting for the character contrast level. Having a scanner operator adjust these parameters is undesirable, since most scanner operators are not properly trained to make these adjustments. As a results, the scanner setup remains at factory set defaults.

Another problem with prior art thresholding is that a threshold value is set for the entire document. This may be a problem if various segments of the document have backgrounds with different intensity values. For example, a document may have one segment which has a light gray background 14 shown in FIG. 1, and another segment which has a dark gray background 16. Selecting one threshold value for the entire document may produce uneven results when converting the document to black and white, since interpretation of the information contained in the document may not be recognized because of insufficient contrast between the foreground and background.

A number of thresholding methods are described in the prior art. Some of the methods compute a global threshold, which is used for the entire image. In these cases, the threshold value is not adapted to local variations in the background. The histogram is often used to determine the value of the threshold, but to compute the histogram, the entire image should be buffered and the histogram should be computed before thresholding the image data. See P. K. Sahoo, S. Soltani, A. K. C. Wong and Y. Chen, "A Survey of Thresholding Techniques," Computer Vision Graphics Image Processing, Vol. 41, pp. 233–260, 1988. A number of locally adaptive approaches that are similar to the adaptive threshold processing method use local windows to determine the threshold, but sometimes are sensitive to noise and may fail to track the background variations. One technique described in U.S. Pat. No. 4,468,704, "Adaptive Thresholder," uses the black and white potentials of each pixel based on maxima and minima to classify the pixels.

SUMMARY OF THE INVENTION

Is an object of the present invention to provide a thresholding method to convert grayscale images to binary images without user intervention.

It is also an object of the present invention to update threshold values throughout a document during the process of converting the grayscale image to a binary image.

The present invention is directed to overcoming one or more of the problems set forth above. Briefly summarized, according to one aspect of the invention, a document is scanned and a region and a sub-region of the document is selected. The intensity value of a pixel in the region is compared to an average intensity value of pixels in a foreground cluster and to an average intensity value of pixels in a background cluster. The pixel is assigned to the foreground cluster if the intensity value of the pixel is closer to the average intensity of the foreground cluster, or to the background cluster if the pixel intensity is closer to the average intensity value of the background cluster. A new average intensity value is calculated for the foreground cluster and the background cluster. A new pixel is selected and compared to the new average intensity values for the foreground and background clusters and the process is repeated until all pixels in the region have been compared. A threshold value is computed based on a function of the average intensity value of pixels in the foreground and background cluster. Each pixel in the sub-region is then converted to a white pixel if the pixel intensity level is greater than the threshold value, or converted to a black pixel if the pixel intensity level is less than the threshold value.

The above, and other objects, advantages and novel features of the present invention will become more apparent from the accompanying detailed description thereof when considered in conjunction with the following drawings.

BRIEF DESCRIPTION OF THE DRAWINGS

Figure 1:
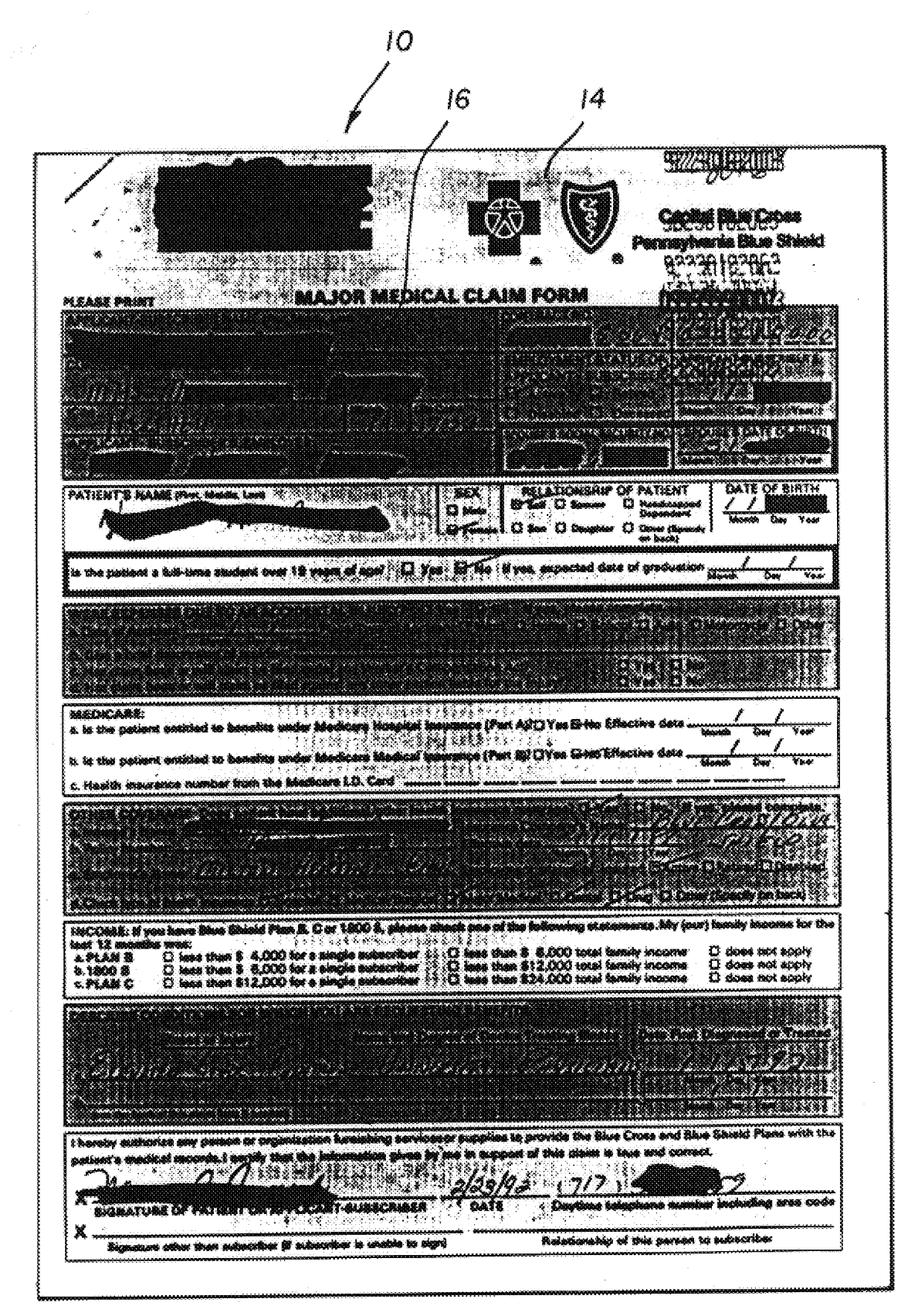

FIG. 1 is a grayscale image produced by scanning a document;

Figure 2:
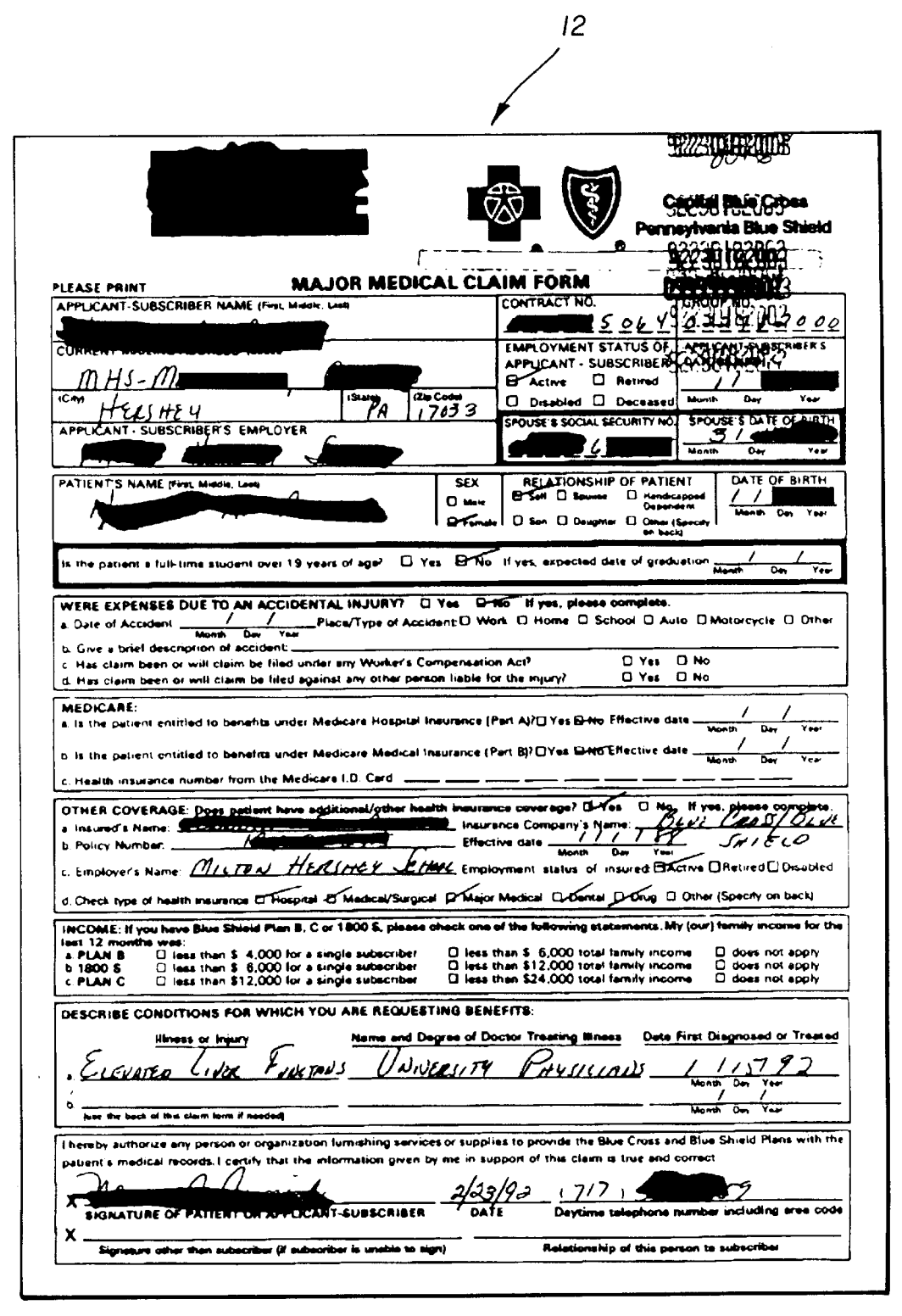

FIG. 2 is a binary image produced from the grayscale image shown in FIG. 1;

DETAILED DESCRIPTION OF THE INVENTION

The present description will be directed in particular to elements forming part of, or in cooperation more directly with, a method in accordance with the present invention. It is to be understood that elements not specifically shown or described may take various forms well known to those skilled in the art.

Figure 3:
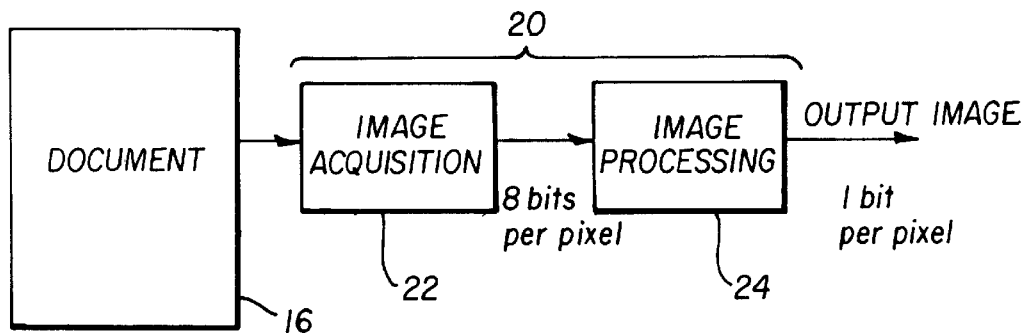
FIG. 3 is a document image processing block diagram.

Referring now to FIG. 3, a high speed document scanner 20 consists of an image acquisition module 22, which scans a document 16 using a linear array, such as a CCD array, and an image processing unit 24. Document 16 is scanned by image acquisition module 22, which presents image data, one scanline at a time, to the image processing unit 24. Image processing unit 24 converts an eight bit per pixel grayscale image to a one bit per pixel black and white image.

Figure 4:
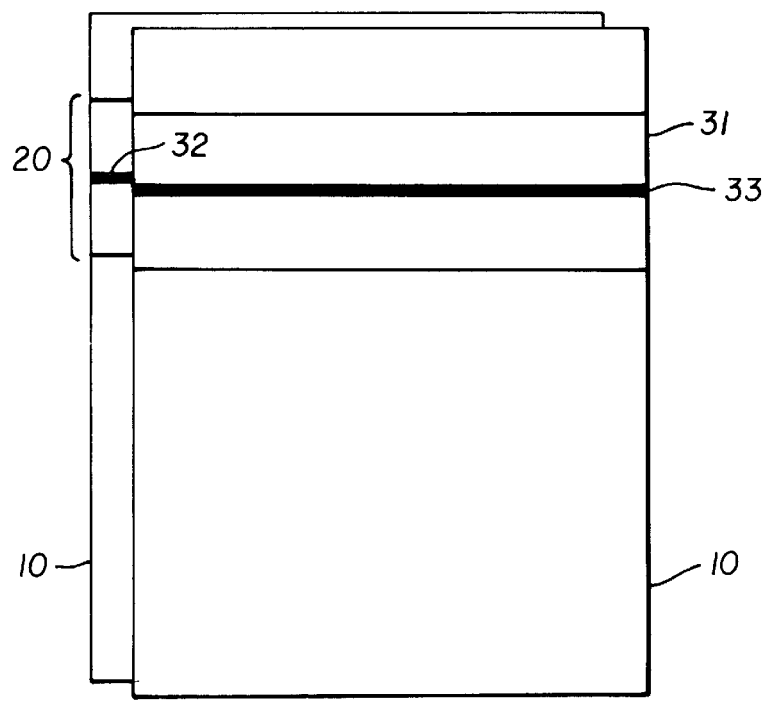
FIG. 4 is a schematic showing the selection of a first region and a first sub-region and a second region and second sub-region.

In one embodiment, shown in FIG. 4, the grayscale image 10 is divided into partially overlapping regions, first region 30, and second region 31. Each region consists of a plurality of contiguous scanlines. Within each region, a sub-region is identified, for example, first sub-region 32 and second sub-region 33. In the preferred embodiment, each sub-region is chosen at the approximate center of the region. See step 40 of FIG. 5.

Figure 6:
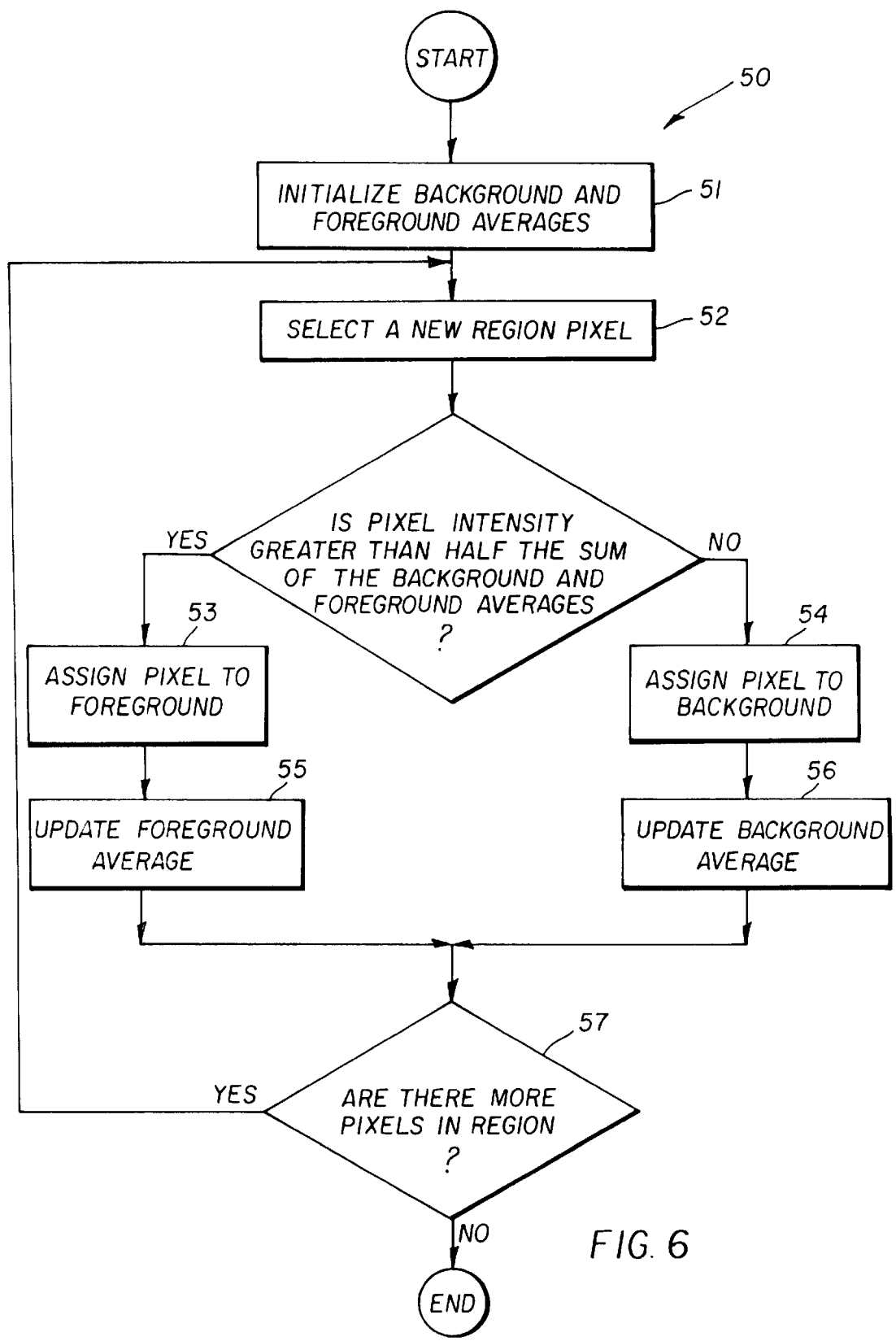
FIG. 6 is a flow diagram for the computation of average intensity value for a foreground and a background cluster.

An average intensity of a foreground and a background cluster for the region are calculated at step 50 by determining an average intensity of pixels assigned to each cluster. For the first region 30, the average foreground and background intensities are initialized to fixed values, for example, 50 and 200, as shown at step 51 in FIG. 6. For subsequent regions of grayscale image 10, the average foreground and background intensities are initialized to the values computed for the previous region.

Every pixel in the region is selected, step 52, one at a time, in a raster fashion and assigned to a foreground if its intensity is closer to the average intensity of the foreground cluster, step 53, otherwise it is assigned to a background cluster 54. After a pixel is assigned, the average intensity value of each cluster is updated, steps 55 and 56, to reflect the inclusion of the new pixel intensity value. The process continues until all the region pixels have been assigned, step 57.

Figure 5:
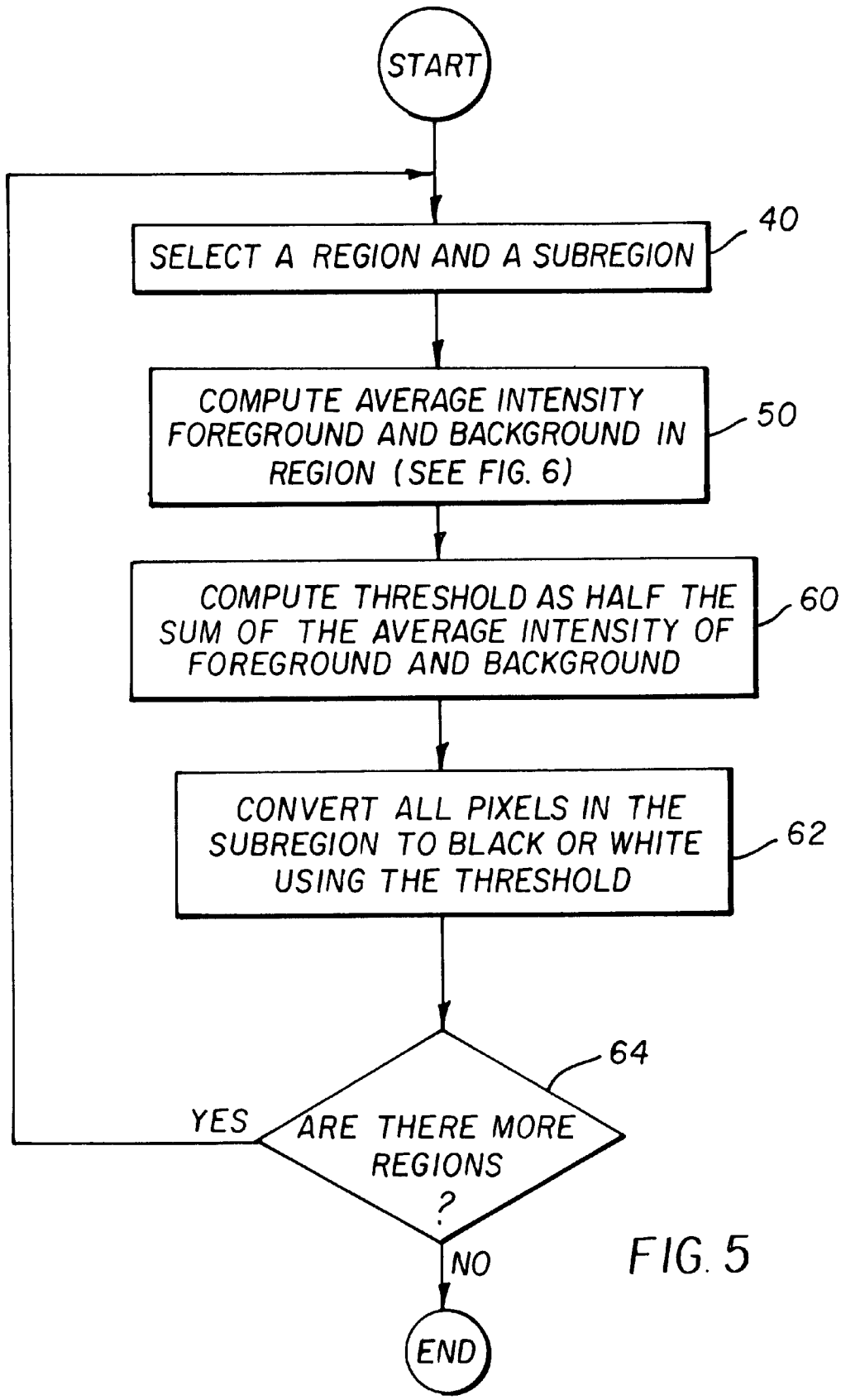
FIG. 5 is a flow diagram of a thresholding processing according to the present invention.
Figure 7:
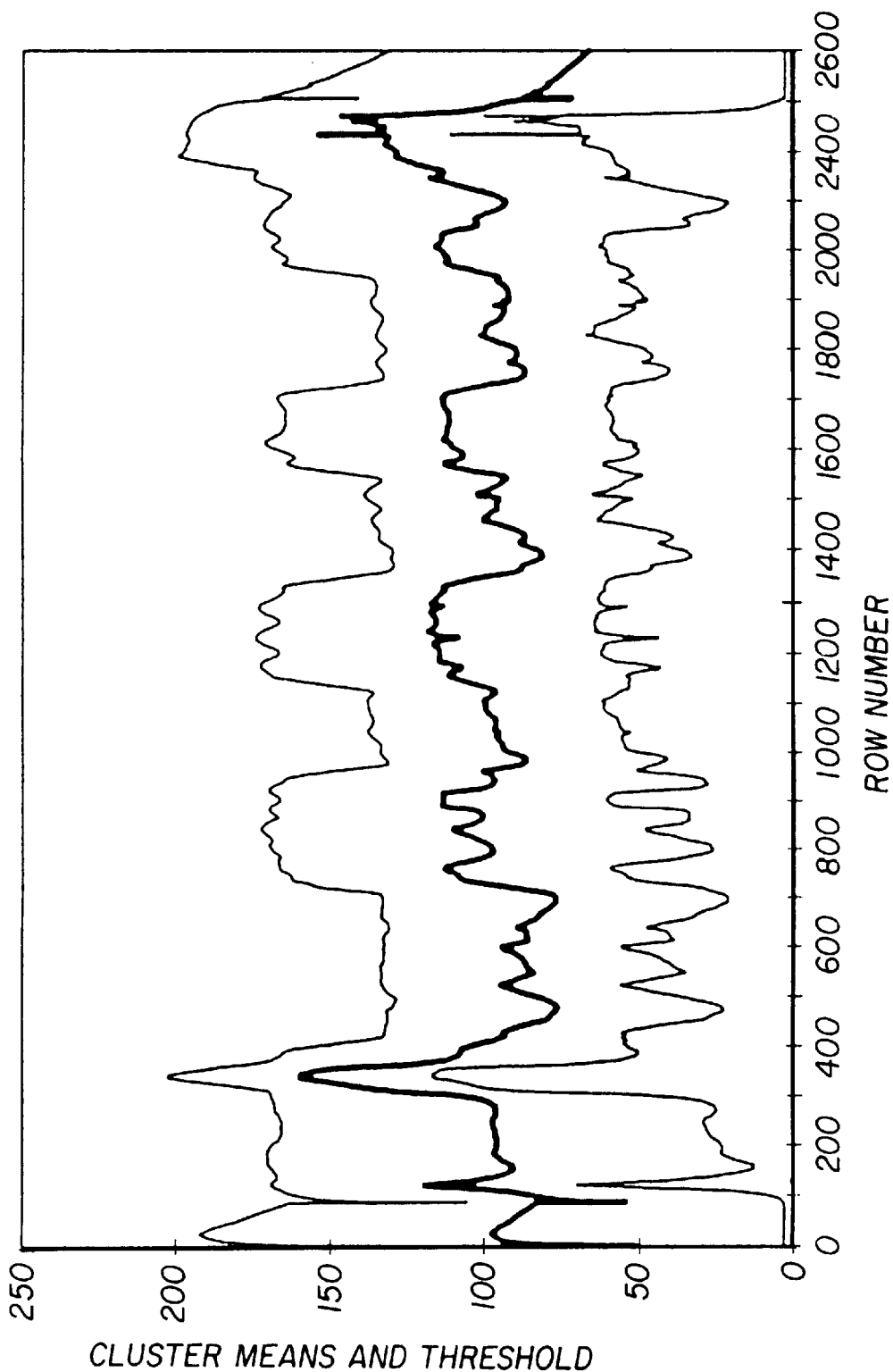
FIG. 7 is a graph showing average background values, average foreground values, and threshold values for document image thresholding according to the present invention.

A threshold for the sub-region is calculated and is equal to a function of the foreground and background average intensities, step 60, as shown in FIG. 5. Typically, the function is equal to one half the sum of the foreground average intensity and background average intensity. The threshold is used to convert the sub-region data to black or white (one bit per pixel), step 64. Another region and sub-region are identified, step 64, and the process is repeated to obtain a new threshold value for the new sub-region. FIG. 7 shows computed threshold values compared to average intensity of pixels in a foreground cluster and a background cluster over an entire document.

An alternate embodiment of the invention uses a reduced update of the foreground cluster and background cluster averages. As in the previous case, every point in the region is visited in a raster fashion and assigned to the foreground cluster if its intensity is closer to the average intensity of the foreground, otherwise the pixel is assigned to the background cluster. The average intensity values of the foreground and background are not updated until all the points in the region have been assigned to either the foreground or the background cluster. The threshold for the sub-region is then computed as a function of the foreground and background cluster average intensities, and is used to convert the sub-region data to black or white as above.

Figure 8:
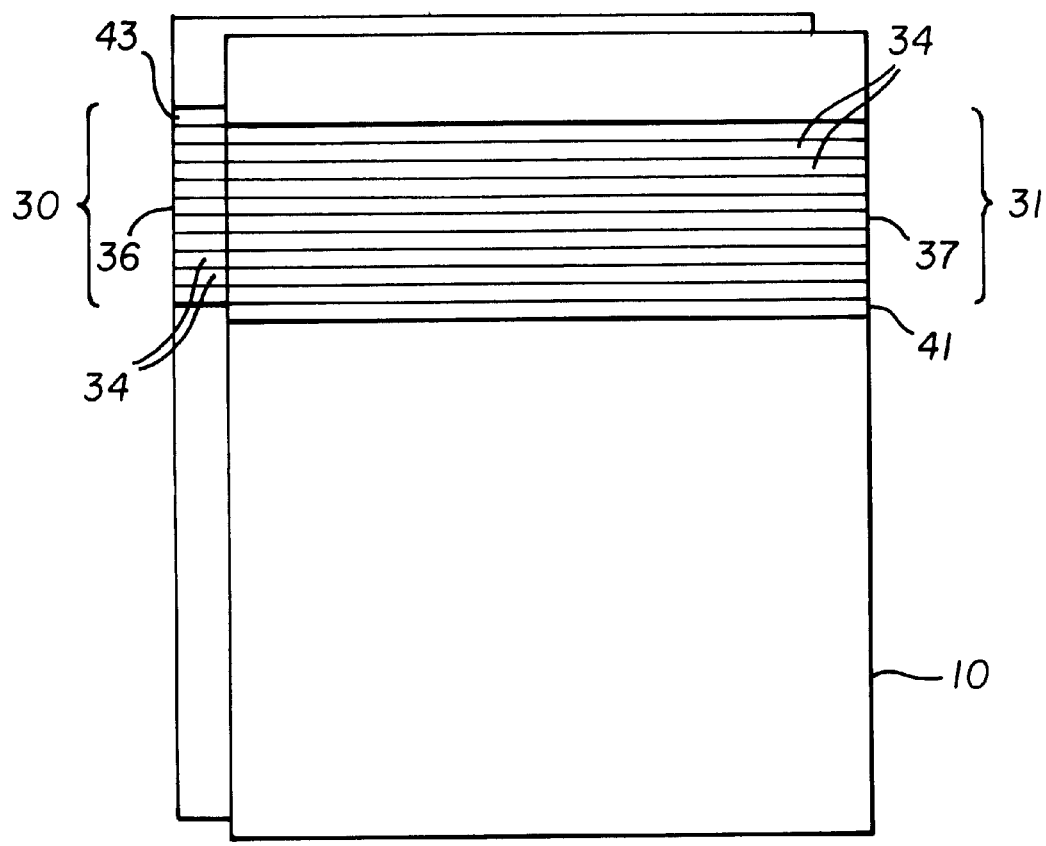
FIG. 8 is a schematic view showing an alternate embodiment with each region divided into a plurality of sub-regions.
Figure 9:
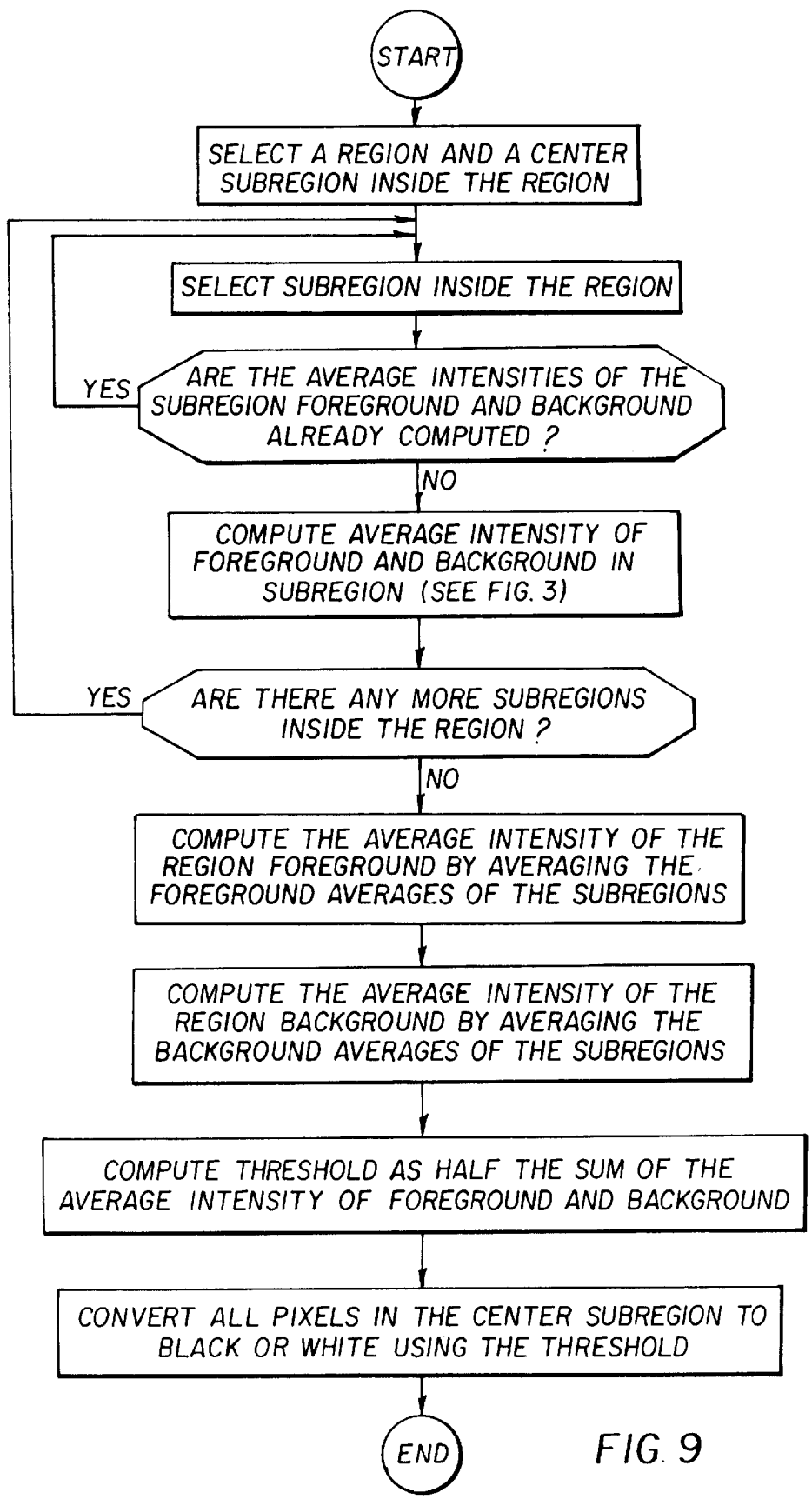
FIG. 9 is a flow diagram for an alternate embodiment of the invention shown in FIG. 8.

Yet another embodiment is shown in FIG. 8. This approach is computationally more efficient than the previous cases. A first region 30 is selected and it is divided into equal sub-regions 34. A center sub-region 36 is identified, for which a threshold will be determined. Each sub-region is processed only once as shown in the flow chart in FIG. 9. A foreground and a background cluster for each sub-region is characterized by the average intensity of and the number of pixels assigned to each cluster. For the first sub-region 43, the average foreground and background intensities are initialized to fixed values, for example, 50 and 200, and for subsequent sub-regions the average foreground and background intensities are initialized to the values computed in the previous sub-region.

Every point in the sub-region is selected in a raster fashion and it is assigned to the foreground cluster if its intensity is closer to the average intensity of the foreground, otherwise it is assigned to the background cluster. After a pixel is assigned, the average intensity of the cluster is updated to reflect the inclusion of the new pixel. The process continues until all the sub-region pixels have been assigned.

The average foreground and background intensities of the first region 30 are computed as a function of the average foreground and background intensities of all the sub-regions inside the region. Finally, a threshold for the center sub-region 36 threshold is computed as a function of the sub-region average foreground cluster and average background cluster intensities. This value is used to convert the center sub-region 36 to black and white data.

A second region 31 is selected which overlaps first region 30. The amount of overlap between first region 30 and second region 31 is a multiple of a width of the sub-region. For example, if a sub-region is one scanline, then the overlap between the first and second region is one, two, three, etc. scanlines. If the width of a sub-region is three scanlines, the overlap between the first and second regions is three scanlines, six scanlines, nine scanlines, etc. In the example shown in FIG. 8, the overlap is one scanline. Using this iterative process for the second region 31, only the most recently added sub-region 41 must have a foreground and background cluster intensity level determined. Then this newest set of foreground and background intensities can be factored in with all the previously computed sub-region foreground and background intensities to compute a threshold for center sub-region 36 as described above.

The invention has been described in detail with particular reference to certain preferred embodiments thereof, but it will be understood that variations and modifications can be effected within the spirit and scope of the invention.

What is claimed is:

1. A document image thresholding method using foreground and background clustering comprising the steps of:

a) scanning a document;

b) selecting a first region of said document comprised of a plurality of contiguous scanlines;

c) selecting a first sub-region of said region;

d) comparing an intensity value of a pixel in said first region to an average intensity value of pixels in a foreground cluster;

e) comparing the intensity value of said pixel to an average intensity value of pixels in a background cluster;

f) assigning said pixel to said foreground cluster if the pixel intensity is closer to said average intensity of said foreground cluster than said background cluster;

g) assigning said pixel to said background cluster if the pixel intensity is closer to said average intensity value of said background cluster than said foreground cluster;

h) calculating a new average intensity value of pixels in said foreground cluster;

i) calculating a new average intensity value of pixels in said background cluster;

j) if a total number of pixels compared in said first region is less than a total number of pixels in said first region, select a new pixel and repeat steps d) through j);

k) computing a threshold value for said first sub-region equal to a function of said new average intensity value of pixels in said background cluster and said new average intensity value of pixels in said foreground cluster;

l) converting each pixel in said first sub-region to a white pixel for each pixel intensity level greater than said threshold value; and m) converting each pixel in said first sub-region to a black pixel for each pixel intensity level less than said threshold value.

2. A document image thresholding method as in claim 1 wherein said first region is approximately 11 scanlines.

3. A document image thresholding method as in claim 1 wherein said first sub-region is approximately 1 scanline.

4. A document image thresholding method as in claim 1 wherein said first sub-region is at an approximate center of said region.

5. A document image thresholding method as in claim 1 comprising:

n) selecting a second region of said document;

o) selecting a second sub-region within said second region;

p) repeating steps d) through l) for said second region and said second sub-region.

6. A document image thresholding method as in claim 5 wherein said second region overlaps said first region.

7. A document image thresholding method as in claim 6 wherein said second region overlaps said first region by an amount equal to a number of scanlines in said first region minus a number of scanlines in said first sub-region.

8. A document image thresholding method as in claim 1 comprising:

setting said average intensity value of pixels in said foreground cluster to an initial value of 50.

9. A document image thresholding method as in claim 1 comprising:

setting said average intensity value of pixels in said background cluster to an initial value of 200.

10. A method as in claim 1 wherein said function is equal to one half a sum of said average intensity value of pixels in said background cluster and said average intensity value of pixels in said foreground cluster.

11. A document image thresholding method using foreground and background clustering comprising the steps of:

a) scanning a document;

b) selecting a plurality of overlapping regions;

c) dividing each of said regions into a plurality of sub-regions wherein each of said regions overlaps an adjacent region;

d) selecting a first region from said plurality of regions;

e) determining whether each sub-region of said first region has a calculated average intensity foreground cluster value;

f) determining whether said each sub-region has a calculated average intensity background cluster value;

g) if each sub-region has a calculated average intensity foreground cluster value and a calculated average intensity background cluster value, go to step p), if not go to step h);

h) comparing an intensity value of a pixel in a first sub-region not having a calculated average intensity background cluster value, to an average intensity value of pixels in a foreground cluster;

i) comparing the intensity value of said pixel to an average intensity value of pixels in a background cluster;

j) assigning said pixel to said foreground cluster if the pixel intensity is closer to said average intensity of said foreground cluster than said background cluster;

k) assigning said pixel to said background cluster if the pixel intensity is closer to said average intensity value of said background cluster than said foreground cluster;

l) calculating a new average intensity value of pixels in said foreground cluster;

m) calculating a new average intensity value of pixels in said background cluster;

n) if a total number of pixels compared in said first sub-region is less than a total number of pixels in said first sub-region, select a new pixel and repeat steps h) through n);

o) go to step e) and continue with steps f) and g);

p) selecting a central sub-region in said first region;

q) determining a combined average intensity background cluster value equal to a function of calculated average intensity background cluster values for said central sub-region and two adjacent sub-regions;

r) determining a combined average intensity foreground cluster value equal to a function of said calculated average intensity foreground cluster value for said central region and said two adjacent sub-regions;

s) computing a threshold value for said central sub-region equal to a function of said combined average intensity background cluster value and said combined average intensity foreground cluster value; and t) converting each pixel in said central sub-region to a white pixel if each pixel intensity level is greater than said threshold value, or converting each pixel in said sub-region to a black pixel if each pixel intensity level is less than said threshold value.

12. A document image thresholding method as in claim 11 wherein each of said regions overlaps an adjacent region by an amount equal to a width of said sub-regions.

13. A document image thresholding method as in claim 12 wherein said width is 1 scanline.

14. A method of converting a grayscale image to a binary image using foreground and background clustering comprising the steps of:

a) selecting a region of said image comprised of a plurality of contiguous scanlines;

b) selecting a sub-region of said region;

c) comparing an intensity value of a pixel in said region to an average intensity value of pixels in a foreground cluster;

d) comparing the intensity value said pixel to an average intensity value of pixels in a background cluster;

e) assigning said pixel to said foreground cluster if the pixel intensity is closer to said average intensity of said foreground cluster than said background cluster;

f) assigning each pixel to said background cluster if the pixel intensity is closer to said average intensity value of said background cluster than said foreground cluster;

g) calculating a new average intensity value of pixels in said foreground cluster;

h) calculating a new average intensity value of pixels in said background cluster;

i) if a total number of pixels checked is less than a total number of pixels in said region, select a new pixel and repeat steps c) through i);

j) computing a threshold value for said sub-region equal to a function of said new average intensity value of pixels in said background cluster, and said new average intensity value of pixels in said foreground cluster; and k) converting each of said image pixels in said sub-region to a white pixel if each pixel intensity level is greater than said threshold value, and converting each of said pixels in said sub-region to a black pixel if each pixel intensity level is less than said threshold value.

15. A document image thresholding method using foreground and background clustering comprising the steps of:

a) scanning a document;

b) selecting a region of said document comprised of a plurality of contiguous scanlines;

c) selecting a sub-region of said region;

d) comparing an intensity value of each pixel in said sub-region to an average intensity value of pixels in a foreground cluster;

e) comparing the intensity value of pixels in said sub-region to an average intensity value of pixels in a background cluster;

f) assigning each pixel in said sub-region to said foreground cluster if the pixel intensity is closer to said average intensity of said foreground cluster than said background cluster;

g) calculating a new average intensity value of pixels in said foreground cluster to include values from said sub-region; and h) assigning each pixel to said background cluster if the pixel intensity is closer to said average intensity value of said background cluster than said foreground cluster;

i) calculating a new average intensity value of pixels in said background cluster to include values for pixels in said region;

j) determining if all sub-regions in said region have a new average intensity value for said foreground and said background cluster, if not select another sub-region and repeat steps d) through j);

k) computing a regional foreground intensity value comprised of an average of all sub-region average intensity values;

l) computing a regional background intensity value comprised of an average of all sub-region average intensity values;

m) computing a threshold value for a center sub-region equal to a function of said regional foreground intensity value and said regional background intensity value;

n) converting each of said image pixel in said center sub-region to a white pixel if each pixel intensity level is greater than said threshold value; and o) converting each pixel in said sub-region to a black pixel if each pixel intensity level is less than said threshold value.

* * * * *